United States Patent
Arise et al.

(10) Patent No.: US 12,355,101 B2
(45) Date of Patent: Jul. 8, 2025

(54) NONAQUEOUS ELECTROLYTE SECONDARY BATTERY LAMINATE, NONAQUEOUS ELECTROLYTE SECONDARY BATTERY MEMBER, AND NONAQUEOUS ELECTROLYTE SECONDARY BATTERY

(71) Applicant: Sumitomo Chemical Company, Limited, Tokyo (JP)

(72) Inventors: Ichiro Arise, Osaka (JP); Saki Morizane, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 679 days.

(21) Appl. No.: 17/698,045

(22) Filed: Mar. 18, 2022

(65) Prior Publication Data

US 2022/0302553 A1 Sep. 22, 2022

(30) Foreign Application Priority Data

Mar. 19, 2021 (JP) ................................. 2021-046210
Feb. 24, 2022 (JP) ................................. 2022-027139

(51) Int. Cl.
| | |
|---|---|
| *H01M 50/417* | (2021.01) |
| *H01M 4/02* | (2006.01) |
| *H01M 4/133* | (2010.01) |
| *H01M 50/423* | (2021.01) |
| *H01M 50/489* | (2021.01) |
| *H01M 50/491* | (2021.01) |

(52) U.S. Cl.
CPC ......... *H01M 50/417* (2021.01); *H01M 4/133* (2013.01); *H01M 50/423* (2021.01); *H01M 50/489* (2021.01); *H01M 50/491* (2021.01); *H01M 2004/027* (2013.01)

(58) Field of Classification Search
CPC .. H01M 50/417; H01M 4/133; H01M 50/423; H01M 50/489; H01M 50/491; H01M 2004/027
See application file for complete search history.

(56) References Cited

U.S. PATENT DOCUMENTS

| | | | |
|---|---|---|---|
| 2017/0062868 A1* | 3/2017 | Kageura | ............... H01M 4/525 |
| 2018/0175353 A1* | 6/2018 | Sakimoto | ................. B32B 3/26 |
| 2019/0067731 A1* | 2/2019 | Kashiwazaki | ...... H01M 50/491 |
| 2019/0190056 A1* | 6/2019 | Arise | .................... H01M 4/583 |

FOREIGN PATENT DOCUMENTS

| | | |
|---|---|---|
| JP | 10-055794 A | 2/1998 |
| JP | 2020-068178 A | 4/2020 |

OTHER PUBLICATIONS

Chang, Young-Chul et al., "Anodic performances of mesocarbon microbeads (MCMB) prepared from synthetic naphthalene isotropic pitch", 1998, Elsevier Science Ltd., p. 1285-1296 (Year: 1998).*

* cited by examiner

*Primary Examiner* — Ula C Ruddock
*Assistant Examiner* — Sydney L Kline
(74) *Attorney, Agent, or Firm* — Panitch Schwarze Belisario & Nadel LLP

(57) ABSTRACT

A nonaqueous electrolyte secondary battery laminate is provided which has a short circuit prevention effect improved by controlling the shape of a dendrite. The nonaqueous electrolyte secondary battery laminate in accordance with an aspect of the disclosure includes a separator and a graphite negative electrode. The graphite negative electrode has a non-reactivity parameter of not less than 230%. The separator has a surface that faces the graphite negative electrode and has an average void volume, obtained by analyzing a microscopic image of the surface, of not more than 0.015 μm$^3$.

7 Claims, No Drawings

NONAQUEOUS ELECTROLYTE SECONDARY BATTERY LAMINATE, NONAQUEOUS ELECTROLYTE SECONDARY BATTERY MEMBER, AND NONAQUEOUS ELECTROLYTE SECONDARY BATTERY

This Nonprovisional application claims priority under 35 U.S.C. § 119 on Patent Applications No. 2021-046210 filed in Japan on Mar. 19, 2021 and No. 2022-027139 filed in Japan on Feb. 24, 2022, the entire contents of which are hereby incorporated by reference.

TECHNICAL FIELD

The present invention relates to a laminate for a nonaqueous electrolyte secondary battery (herein also referred to as a "nonaqueous electrolyte secondary battery laminate"), a member for a nonaqueous electrolyte secondary battery (herein also referred to as a "nonaqueous electrolyte secondary battery member"), and a nonaqueous electrolyte secondary battery.

BACKGROUND ART

Nonaqueous electrolyte secondary batteries, particularly lithium ion secondary batteries, have a high energy density, and are therefore widely used as batteries for personal computers, mobile telephones, portable information terminals, cars, and the like.

In recent years, there has been high demand for lithium ion secondary batteries which have high output power. In order to satisfy the demand, development of lithium ion secondary batteries provided with a separator excellent in ion permeability is in progress.

However, such lithium ion secondary batteries have a problem in that a lithium deposit which has grown to be fibrous tends to cause a micro short circuit and to consequently lead to voltage reduction. The micro short circuit is one factor that lowers long-term reliability of those batteries.

In relation to this, Patent Literature 1 discloses a porous film that has a skin layer which is formed on at least one surface of the porous film and which has a specific void area ratio in an in-plane direction. Further, Patent Literature 2 discloses a separator which has a pattern area in which a pattern is formed and a non-pattern area in which no pattern is formed.

CITATION LIST

Patent Literature

[Patent Literature 1]
Japanese Patent Application Publication, Tokukaihei, No. 10-055794
[Patent Literature 2]
Japanese Patent Application Publication, Tokukai, No. 2020-068178

SUMMARY OF INVENTION

Technical Problem

However, in a method for inhibiting growth of a dendrite in lithium ion secondary batteries, there has been room for further development. For example, the dendrite is known to become more fibrous as the dendrite grows. The more fibrous the dendrite becomes, the easier it is for the dendrite to extend in pores of a separator. Accordingly, in order to prevent a short circuit that may occur as a result of growth of the dendrite, controlling the shape of the dendrite is important. However, in the above literatures, controlling the shape of a dendrite is not taken into consideration.

An object of an aspect of the present invention is to provide a nonaqueous electrolyte secondary battery laminate which has a short circuit prevention effect improved by controlling the shape of a dendrite.

Solution to Problem

The present invention encompasses the following aspects.
<1>
A nonaqueous electrolyte secondary battery laminate including: a separator; and a graphite negative electrode, the graphite negative electrode having a non-reactivity parameter of not less than 230%, the separator having a surface that faces the graphite negative electrode and that has an average void volume, obtained by analyzing a microscopic image of the surface, of not more than 0.015 $\mu m^3$.
<2>
The laminate described in <1>, wherein the separator is a laminated separator including a porous layer and a polyolefin porous film.
<3>
The laminate described in <2>, wherein the porous layer contains a nitrogen-containing aromatic resin.
<4>
The laminate described in <3>, wherein the nitrogen-containing aromatic resin is an aramid resin.
<5>
The laminate described in any one of <1> to <4>, wherein the separator has a compressive elastic modulus, in a thickness direction of the separator, of not less than 50 MPa.
<6>
A nonaqueous electrolyte secondary battery member including: a positive electrode; and a laminate described in any one of <1> to <5>, the positive electrode, the separator, and the graphite negative electrode being formed in this order.
<7>
A nonaqueous electrolyte secondary battery including a laminate described in any one of <1> to <5> or a member described in <6>.

Advantageous Effects of Invention

An aspect of the present invention provides a nonaqueous electrolyte secondary battery laminate which has a short circuit prevention effect improved by controlling the shape of a dendrite.

DESCRIPTION OF EMBODIMENTS

The following description will discuss embodiments of the present invention. Note, however, that the present invention is not limited to the embodiments. The present invention is not limited to arrangements described below, but may be altered in various ways by a skilled person within the scope of the claims. The present invention also encompasses, in its technical scope, any embodiment derived by combining technical means disclosed in differing embodiments. Any numerical range expressed as "A to B" herein means "not less than A and not more than B" unless otherwise stated.

1. Laminate

A nonaqueous electrolyte secondary battery laminate in accordance with an embodiment of the present invention includes: a separator; and a graphite negative electrode. The graphite negative electrode has a non-reactivity parameter of not less than 230%. The separator has a surface facing the graphite negative electrode and having an average void volume, obtained by analyzing a microscopic image of the surface, of not more than 0.015 $\mu m^3$.

According to the finding of the inventors of the present invention, the shape of a dendrite which grows on a surface of a negative electrode can be controlled by controlling smoothness of a surface of the separator. In other words, if a separator has a highly smooth surface on a side which faces a negative electrode, a growing dendrite can be controlled to be granular or tabular. Even if a dendrite having such a shape is formed, the dendrite is unlikely to penetrate through the separator. On the contrary, a separator having low smoothness on a side which faces a negative electrode causes a fibrous dendrite to grow. The dendrite having such a shape is highly likely to penetrate through the separator.

In the present specification, the smoothness of a separator surface is expressed by an average void volume of the separator surface. A separator included in the laminate in accordance with an embodiment of the present invention has a surface facing the graphite negative electrode and having an average void volume of not more than 0.015 $\mu m^3$, preferably not more than 0.012 $\mu m^3$, and more preferably not more than 0.010 $\mu m^3$. The average void volume has a lower limit that is not limited to any particular value. The average void volume is, for example, not less than 5 $nm^3$.

The average void volume of a separator surface is calculated by analyzing a scanning electron microscopic image (SEM image) of the separator surface. Specifically, the average void volume of a separator surface is obtained and set as follows: The respective areas of portions that are included in the image of the separator surface and that fall into a void larger than a reference are measured, and a value given by dividing a sum of the areas of voids larger than the reference by the number of voids larger than the reference is raised to the power of three-halves. Portions falling into a void can be identified by, for example, the difference of luminance.

The following shows an example of a method for calculating the average void volume when Image J (provided by the National Institute of Health) is used as image analysis software.

1. Load an image obtained by using a scanning electron microscope, and register a scale.
2. Select a rectangular area (by using a polygon tool) such that the entire separator surface can be contained. In selecting the rectangular area, care should be taken so that an area irrelevant to the separator surface (e.g., file name of the image, black background) would not be contained in the rectangular area.
3. Select "Edit-clear outside" from a pulldown menu, and trim a portion which is outside the area which has been selected.
4. Select "8-bit" from "Image-Type" of the pulldown menu.
5. Select "Process-Filters-Median" from the pulldown menu, confirm that "2 pixel" is set, and press the OK button. This removes smaller noises.
6. Select "Image-Adjust-threshold", and appropriately adjust the positions of two slide bars. This causes void portions on the separator surface to be indicated in red. After completing the adjustment, select "apply".
7. Select "Analyze-analyze particle". This causes the respective areas of the void portions on the separator surface to be automatically calculated, and the resultant numerical values are saved in a csv file. Open the saved file, and select any void portions having an area of not less than 0.02 $\mu m^2$, from the void portions on the separator surface that have been subjected to the calculation of the areas thereof. Calculate a value given by dividing a sum of the areas of void portions having an area of not less than 0.02 $\mu m^2$ by the number of void portions having an area of not less than 0.02 $\mu m^2$, and raise the value to the power of three-halves to set the raised value as the average void volume of the separator surface that has voids susceptible to penetration of a dendrite.

According to the novel finding of the inventors of the present invention, the shape of a dendrite which grows on a surface of a negative electrode can be controlled also through the amount of the edge planes of graphite contained in the graphite negative electrode. In other words, a graphite negative electrode containing a small amount of edge planes of graphite makes it possible to control a growing dendrite in a granular or tabular shape. Even if a dendrite having such a shape is formed, the dendrite is unlikely to penetrate through the separator. On the contrary, a graphite negative electrode containing a large amount of edge planes of graphite causes a fibrous dendrite to grow. A dendrite having such a shape is highly likely to penetrate through the separator.

In the present specification, the amount of the edge planes of graphite included in the graphite negative electrode is expressed by a non-reactivity parameter. When graphite includes a smaller amount of edge planes, the non-reactivity parameter tends to be greater. The graphite negative electrode included in the laminate in accordance with an embodiment of the present invention has a non-reactivity parameter of not less than 230%, preferably not less than 231%, more preferably not less than 232%, and even more preferably not less than 233%. The upper limit of the non-reactivity parameter is not limited to any particular value. The non-reactivity parameter is, for example, not more than 250%.

The non-reactivity parameter of a graphite negative electrode is given as a value obtained by dividing a charge-discharge efficiency measured for a coin cell including graphite-containing electrodes by a charge-discharge efficiency measured for a coin cell including non-graphite-containing electrodes. See Examples of the present application for more specific method for the measurement.

In the present specification, the amount of the edge planes of the graphite included in the graphite negative electrode can be expressed also by a capacitance between the graphite electrodes. When the amount of the edge planes of the graphite is smaller, the capacitance tends to be smaller. The graphite negative electrode included in the laminate in accordance with an embodiment of the present invention has a capacitance between the graphite electrodes of preferably not more than 0.4 $Fg^{-1}$, and more preferably not more than 0.35 $Fg^{-1}$. The capacitance has a lower limit that is not limited to any particular value. The capacitance is, for example, not less than 0.005 $Fg^{-1}$.

An electric double layer capacitor is made by using two graphite electrodes identical to each other. Then, the capacitance between the graphite electrodes can be measured. See Reference Experiment of the present application for more specific method for the measurement.

According to further finding of the inventors of the present invention, rigidity in a thickness direction of the separator can also be a factor for controlling the shape of a dendrite which grows on a surface of a negative electrode. A separator having high rigidity in the thickness direction of the separator is unlikely to deform in the thickness direction. This makes it difficult to form a space between the negative electrode and the separator. Under such a condition, the shape of a growing dendrite tends to be granular or tabular. Even if a dendrite having such a shape is formed, the dendrite is unlikely to penetrate through the separator. On the contrary, a separator having low rigidity in the thickness direction of the separator makes it easy to form a space between the negative electrode and the separator. This tends to cause a fibrous dendrite to grow. The dendrite having such a shape is highly likely to penetrate through the separator.

In the present specification, the rigidity in the thickness direction of the separator is expressed by a compressive elastic modulus in the thickness direction of the separator. In an embodiment, the compressive elastic modulus in the thickness direction of the separator is preferably not less than 50 MPa, more preferably not less than 55 MPa, still more preferably not less than 60 MPa, and particularly preferably not less than 75 MPa. In an embodiment, the compressive elastic modulus in the thickness direction of the separator is not more than 300 MPa, more preferably not more than 250 MPa, still more preferable not more than 175 MPa, and particularly preferably not more than 125 MPa. Examples of a combination of a lower limit and the upper limit of the compressive elastic modulus in the thickness direction of the separator include a combinations of 50 MPa and 300 MPa, 55 MPa and 250 MPa, 60 MPa and 175 MPa, and 75 MPa and 125 MPa. The compressive elastic modulus in the thickness direction of the separator is measured by using a micro compression tester. For example, MCT-510 (manufactured by Shimadzu Corporation) is used as the micro compression tester.

In the present specification, the shape of the dendrite is determined on the basis of an SEM image (magnification: 5000 times). In the present specification, the shape of the dendrite is classified by an aspect ratio (value of long diameter to short diameter) of the dendrite. A dendrite having an aspect ratio of less than 2 is referred to as "granular". A dendrite formed by a plurality of connected granular dendrites is referred to as "tabular". A dendrite having an aspect ratio of more than 13 is referred to as "fibrous". See Examples of the present application for a test method for generating a dendrite. The shape of the dendrite generated in a dendrite generating test is most preferably granular, and second most preferably tabular. Since a fibrous dendrite may penetrate through the separator, the fibrous dendrite is not preferable.

1.1. Separator

The separator included in the laminate in accordance with an embodiment of the present invention is not limited to any particular separator, provided that the separator satisfies the requirement of the average void volume described above. In an embodiment, the separator is a laminated separator which includes a porous layer and a polyolefin porous film. In an embodiment, only the porous layer serves the function of the separator. In an embodiment, only the polyolefin porous film serves the function of the separator.

When the separator is a laminated separator, a surface that satisfy the requirement of the average void volume described above may be a surface of the porous layer, or may be a surface of the polyolefin porous film. In an embodiment, a surface that satisfies the requirement of the average void volume described above is a surface of the porous layer. A surface facing the graphite negative electrode in the laminate needs to satisfy the requirement of the average void volume described above.

1.1.1. Porous Layer

In the nonaqueous electrolyte secondary battery, the porous layer can be provided, as a member forming the nonaqueous electrolyte secondary battery separator in accordance with an embodiment of the present invention, between the polyolefin porous film and at least one of a positive electrode and the negative electrode.

The porous layer can be formed on an active material layer of at least one of the positive electrode and the negative electrode in the nonaqueous electrolyte secondary battery. The porous layer may be provided between the polyolefin porous film and at least one of the positive electrode and the negative electrode so as to be in contact with the polyolefin porous film and the at least one of the positive electrode and the negative electrode. The porous layer may be made of one or more layers.

The porous layer contains a resin. The porous layer is preferably an insulating porous layer which contains an insulating resin.

When the porous layer is formed on one surface of the polyolefin porous film, the porous layer is preferably formed on a surface which faces the negative electrode in the nonaqueous electrolyte secondary battery, the surface being one of surfaces of the polyolefin porous film. More preferably, the porous layer is formed on a surface in contact with the negative electrode in the nonaqueous electrolyte secondary battery.

Resin

It is preferable that the resin be insoluble in an electrolyte of the battery and be electrochemically stable when the battery is in normal use.

Examples of the resin include: polyolefins; (meth)acrylate-based resins; nitrogen-containing aromatic resins; fluorine-containing resins; polyamide-based resins; polyimide-based resins; polyester-based resins; rubbers; resins each having a melting point or a glass transition temperature of not lower than 180° C.; water-soluble polymers; and polycarbonate, polyacetal, and polyether ether ketone.

Among the above resins, one or more resins selected from the group consisting of polyolefins, (meth)acrylate-based resins, fluorine-containing resins, nitrogen-containing aromatic resins, polyamide-based resins, polyester-based resins and water-soluble polymers are preferable.

Further, nitrogen-containing aromatic resins are particularly preferable as the resin. The nitrogen-containing aromatic resins are excellent in heat resistance since the nitrogen-containing aromatic resins include a bond via nitrogen, such as an amide bond. Therefore, when the resin is a nitrogen-containing aromatic resin, the heat resistance of the porous layer can be suitably improved. This consequently improves heat resistance of the nonaqueous electrolyte secondary battery separator containing the porous layer.

Preferable examples of the polyolefins include polyethylene, polypropylene, polybutene, and an ethylene-propylene copolymer.

Examples of the fluorine-containing resins include: polyvinylidene fluoride (PVDF), polytetrafluoroethylene, a vinylidene fluoride-hexafluoropropylene copolymer, a tetrafluoroethylene-hexafluoropropylene copolymer, a tetrafluoroethylene-perfluoroalkyl vinyl ether copolymer, a vinylidene fluoride-tetrafluoroethylene copolymer, a vinylidene fluoride-trifluoroethylene copolymer, a vinylidene fluoride-trichloroethylene copolymer, a vinylidene fluoride-vinyl fluoride copolymer, a vinylidene fluoride-hexafluoropropylene-tetrafluoroethylene copolymer, and an ethylene-tetrafluoroethylene copolymer; and a fluorine-containing rubber having a glass transition temperature of not more than 23° C. among the fluorine-containing resins.

The polyamide-based resins are preferably polyamide-based resins which are nitrogen-containing aromatic resins, and particularly preferably aramid resins such as aromatic polyamides and wholly aromatic polyamides.

Specific examples of the aramid resins include poly (paraphenylene terephthalamide), poly(metaphenylene isophthalamide), poly(parabenzamide), poly(metabenzamide), poly(4,4'-benzanilide terephthalamide), poly(paraphenylene-4,4'-biphenylene dicarboxylic acid amide), poly (metaphenylene-4,4'-biphenylene dicarboxylic acid amide), poly(paraphenylene-2,6-naphthalene dicarboxylic acid amide), poly(metaphenylene-2,6-naphthalene dicarboxylic acid amide), poly(2-chloroparaphenylene terephthalamide), a paraphenylene terephthalamide/2,6-dichloroparaphenylene terephthalamide copolymer, and a metaphenylene terephthalamide/2,6-dichloroparaphenylene terephthalamide copolymer. Among the above aramid resins, poly (paraphenylene terephthalamide) is more preferable.

The polyester-based resins are preferably aromatic polyesters such as polyarylates, and liquid crystal polyesters.

Examples of the rubbers include a styrene-butadiene copolymer and a hydride thereof, a methacrylate ester copolymer, an acrylonitrile-acrylic ester copolymer, a styrene-acrylic ester copolymer, ethylene propylene rubber, and polyvinyl acetate.

Examples of the resins each having a melting point or a glass transition temperature of not lower than 180° C. include polyphenylene ether, polysulfone, polyether sulfone, polyphenylene sulfide, polyetherimide, polyamide imide, and polyether amide.

Examples of the water-soluble polymers include polyvinyl alcohol, polyethylene glycol, cellulose ether, sodium alginate, polyacrylic acid, polyacrylamide, and polymethacrylic acid.

Note that it is possible to use, as the resin, only one of the above resins or two or more of the above resins in combination. The resin is contained in the porous layer at a proportion of preferably 25% by weight to 80% by weight and more preferably 30% by weight to 70% by weight when the total weight of the porous layer is 100% by weight.

Filler

In an embodiment of the present invention, the porous layer preferably contains a filler. The filler may be an inorganic filler or an organic filler. The filler is preferably an inorganic filler which is made of one or more inorganic oxides selected from the group consisting of silica, calcium oxide, magnesium oxide, titanium oxide, alumina, mica, zeolite, aluminum hydroxide, boehmite, and the like.

Note that in order to improve a water-absorbing property of the inorganic filler, it is possible to subject an inorganic filler surface to hydrophilization treatment with, for example, a silane coupling agent.

The filler is contained in the porous layer at a proportion of preferably not less than 20% by weight and more preferably not less than 30% by weight when the total weight of the porous layer is 100% by weight. Meanwhile, the filler is contained in the porous layer at a proportion of preferably not more than 80% by weight and more preferably not more than 70% by weight when the total weight of the porous layer is 100% by weight. Examples of a combination of a lower limit and an upper limit of the content of the filler include combinations of 20% by weight and 80% by weight, and 30% by weight and 70% by weight. If the content of the filler is within the above range, it is possible to easily obtain a porous layer which has sufficient ion permeability.

The porous layer is preferably provided between the polyolefin porous film and a negative electrode active material layer which is provided in the negative electrode. Physical properties of the porous layer in the description below indicate at least those of the porous layer which is provided between the polyolefin porous film and the negative electrode active material layer provided in the negative electrode when the nonaqueous electrolyte secondary battery is configured.

The porous layer has a weight per unit area which can be set as appropriate in view of strength, thickness, weight, and handleability of the porous layer. The weight per unit area of the porous layer is preferably 0.5 g/m$^2$ to 3.5 g/m$^2$ per layer and more preferably 1.0 g/m$^2$ to 3.0 g/m$^2$ per layer of the porous layer.

If the porous layer has a weight per unit area which is set to fall within the above numerical range, the nonaqueous electrolyte secondary battery including the porous layer can have a higher weight energy density and a higher volume energy density. If the weight per unit area of the porous layer is beyond the above range, the nonaqueous electrolyte secondary battery including the porous layer tends to be heavy.

The porous layer has a porosity of preferably 20% by volume to 90% by volume, and more preferably 30% by volume to 80% by volume, in order to achieve sufficient ion permeability.

The porous layer has pores whose diameter is preferably not more than 1.0 μm, and more preferably not more than 0.5 μm. If the pores each have such a diameter, the nonaqueous electrolyte secondary battery including the porous layer can achieve sufficient ion permeability.

The porous layer has an air permeability of preferably 30 s/100 mL to 80 s/100 mL, and more preferably 40 s/100 mL to 75 s/100 mL, in terms of Gurley values. If the air permeability of the porous layer is within the above range, it can be said that the porous layer has sufficient ion permeability.

The thickness of the porous layer is preferably not less than 0.1 μm, more preferably not less than 0.3 μm, and still more preferably not less than 0.5 μm. The thickness of the porous layer is preferably not more than 20 μm, more preferably not more than 10 μm, and still more preferably not more than 5 μm. Examples of a combination of a lower limit and an upper limit of the thickness of the porous layer include combinations of 0.1 μm and 20 μm, 0.3 μm and 10 μm, and 0.5 μm and 5 μm. When the thickness of the porous layer is within the above range, it is possible to exert a sufficient function of the porous layer (e.g., to impart heat resistance) and also to reduce the whole thickness of the separator.

Examples of Preferable Combination of Resin and Filler

In an embodiment, the resin contained in the porous layer has an intrinsic viscosity of 1.4 dL/g to 4.0 dL/g and the filler contained in the porous layer has an average particle diameter of not more than 1 μm. Use of the porous layer having such composition makes it possible to prepare a laminated separator which achieves all of heat resistance, ion permeability and reduction in thickness.

The intrinsic viscosity of the resin in the porous layer is preferably not less than 1.4 dL/g and more preferably not less than 1.5 dL/g. Meanwhile, the intrinsic viscosity of the resin in the porous layer is preferably not more than 4.0 dL/g, more preferably not more than 3.0 dL/g, and still more preferably not more than 2.0 dL/g. The porous layer containing the resin having an intrinsic viscosity of not less than 1.4 dL/g can impart sufficient heat resistance to the laminated separator. The porous layer containing the resin having an intrinsic viscosity of not more than 4.0 dL/g has sufficient ion permeability. See Examples of the present application for a method for measuring the intrinsic viscosity.

The resin having an intrinsic viscosity of 1.4 dL/g to 4.0 dL/g can be synthesized by adjusting a molecular weight distribution of the resin, the molecular weight distribution being adjusted by appropriately setting synthesis conditions (e.g., amount of monomers to be put in, synthesis temperature, and synthesis time). Alternatively, a commercially available resin having an intrinsic viscosity of 1.4 dL/g to 4.0 dL/g may be used. In an embodiment, the resin having an intrinsic viscosity of 1.4 dL/g to 4.0 dL/g is an aramid resin.

The filler contained in the porous layer has an average particle diameter of preferably not more than 1 μm, more preferably not more than 800 nm, still more preferably not more than 500 nm, still more preferably not more than 100 nm, and still more preferably not more than 50 nm. The average particle diameter of the filler here is an average value of sphere equivalent particle diameters of 50 particles of the filler. Further, the sphere equivalent particle diameters of the filler are each a value which is obtained by actual measurement with use of a transmission electron microscope. The following is a specific example of a measurement method.

1. An image of the filler is captured by using a transmission electron microscope (TEM; JEOL Ltd., transmission electron microscope JEM-2100F) at an acceleration voltage of 200 kV and at a magnification ratio of 10000 times with use of a Gatan Imaging Filter.
2. In the image thus obtained, an outline of a particle is traced by using image analysis software (ImageJ) and a sphere equivalent particle diameter of a filler particle (primary particle) is measured.
3. The above measurement is carried out for 50 filler particles which have been randomly extracted. The average particle diameter is an arithmetic average of sphere equivalent particle diameters of the 50 filler particles.

If the average particle diameter of the filler is set to not more than 1 μm, it is possible to reduce the thickness of the laminated separator. The average particle diameter of the filler has a lower limit that is not particularly limited. The average particle diameter can be, for example, not less than 5 nm.

1.1.2. Polyolefin Porous Film

A laminated separator in accordance with an embodiment of the present invention includes a polyolefin porous film.

Note, here, that the "polyolefin porous film" is a porous film which contains a polyolefin-based resin as a main component. Note that the phrase "contains a polyolefin-based resin as a main component" means that a porous film contains a polyolefin-based resin at a proportion of not less than 50% by volume, preferably not less than 90% by volume, and more preferably not less than 95% by volume, relative to all materials of which the porous film is made.

The polyolefin porous film contains a polyolefin-based resin as a main component and has therein many pores connected to one another, so that gas and liquid can pass through the polyolefin porous film from one surface to the other. Note that, hereinafter, the polyolefin porous film is also simply referred to as a "porous film".

The polyolefin more preferably contains a high molecular weight component having a weight-average molecular weight of $5 \times 10^5$ to $15 \times 10^6$. In particular, the polyolefin more preferably contains a high molecular weight component having a weight-average molecular weight of not less than 1,000,000 because the strength of the nonaqueous electrolyte secondary battery separator in accordance with an embodiment of the present invention improves.

Examples of the polyolefin include homopolymers and copolymers which are each obtained by polymerizing a monomer(s) such as ethylene, propylene, 1-butene, 4 methyl-1-pentene, 1-hexene, and/or the like.

Examples of such homopolymers include polyethylene, polypropylene, and polybutene. Meanwhile, examples of the copolymers include an ethylene-propylene copolymer.

Among the above polyolefins, polyethylene is more preferable as the polyolefin because it is possible to prevent a flow of an excessively large electric current at a lower temperature. Note that the phrase "to prevent a flow of an excessively large electric current" is also referred to as "shutdown".

Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Among these polyethylenes, the polyethylene is more preferably ultra-high molecular weight polyethylene having a weight-average molecular weight of not less than 1,000,000.

The weight per unit area of the porous film can be set as appropriate in view of strength, thickness, weight, and handleability. Note, however, that the weight per unit area of the porous film is preferably 4 g/m² to 20 g/m², more preferably 4 g/m² to 12 g/m², and still more preferably 5 g/m² to 10 g/m², so as to allow the nonaqueous electrolyte secondary battery to have a higher weight energy density and a higher volume energy density.

The porous film has an air permeability of preferably 30 s/100 mL to 500 s/100 mL, and more preferably 50 s/100 mL to 300 s/100 mL, in terms of Gurley values. A porous film having an air permeability in the above range can achieve sufficient ion permeability.

The porous film has a porosity of preferably 20% by volume to 80% by volume, and more preferably 30% by volume to 75% by volume, so as to (i) retain an electrolyte in a larger amount and (ii) obtain the function of reliably preventing a flow of an excessively large electric current at a lower temperature.

Further, in order to achieve sufficient ion permeability and prevent particles from entering the positive electrode and/or the negative electrode, the porous film has pores each having a pore diameter of preferably not more than 0.3 μm, and more preferably not more than 0.14 μm.

A separator 1 may further include another layer(s) such as an adhesive layer, a heat-resistant layer, a protective layer, and/or the like, in addition to the polyolefin porous film.

Further, the nonaqueous electrolyte secondary battery separator preferably has a thickness that makes it possible to provide a dendrite with a travel distance long enough to prevent the occurrence of a micro short circuit and that makes it possible to keep preferable ion conductivity.

In view of the above, the thickness of the polyolefin porous film is preferably not less than 4 μm, more preferably not less than 5 μm, and still more preferably not less than 6 μm. Meanwhile, the thickness of the polyolefin porous film is preferably not more than 29 μm, more preferably not more than 20 μm, and still more preferably not more than 15 μm. Examples of a combination of a lower limit and an upper limit of the thickness of the polyolefin porous film include combinations of 4 μm and 29 μm, 5 μm and 20 μm, and 6 μm and 15 μm.

1.2. Graphite Negative Electrode

The graphite negative electrode in accordance with an embodiment of the present invention contains graphite as a negative electrode active material, and satisfies the requirement of a non-reactivity parameter described above. As the graphite negative electrode, a negative electrode sheet having a structure in which an active material layer containing a negative electrode active material and a binding agent is formed on a negative electrode current collector can be used. Note that the active material layer can further contain an electrically conductive agent and/or a binding agent.

Examples of graphite serving as the negative electrode active material include natural graphite, artificial graphite, Meso Carbon Micro Beads (MCMB), graphitizable carbon, non-graphitizable carbon, and silicon-based compound-containing graphite material. Alternatively, graphite covered with another material may be used.

Examples of the negative electrode current collector include Cu, Ni, and stainless steel. Among these materials, Cu is more preferable because Cu is not easily alloyed with lithium and is easily processed into a thin film.

2. Method for Producing Laminate 2.1. Method for Producing Polyolefin Porous Film The following method is an example of a method for producing the porous film. That is, first, a polyolefin-based resin is kneaded together with a pore forming agent such as an inorganic bulking agent or a plasticizer, and optionally with another agent(s) such as an antioxidant, so as to produce a polyolefin-based resin composition. Then, the polyolefin-based resin composition is extruded, so that a polyolefin-based resin composition in a sheet form is prepared. Further, the pore forming agent is removed from the polyolefin-based resin composition in the sheet form with use of an appropriate solvent. Thereafter, the polyolefin porous film can be produced by stretching the polyolefin-based resin composition from which the pore forming agent has been removed.

The inorganic bulking agent is not particularly limited. Examples of the inorganic bulking agent include inorganic fillers; one specific example is calcium carbonate. The plasticizer is not particularly limited. The plasticizer can be a low molecular weight hydrocarbon such as liquid paraffin.

The method for producing the porous film can be, for example, a method including the following steps:
(i) obtaining a polyolefin-based resin composition by kneading an ultra-high molecular weight polyethylene having a weight-average molecular weight of not less than 1,000,000, a low molecular weight polyolefin having a weight-average molecular weight of not more than 10,000, a pore forming agent such as calcium carbonate or a plasticizer, and an antioxidant;
(ii) forming a sheet by cooling, in stages, the polyolefin-based resin composition obtained;
(iii) removing, with use of an appropriate solvent, the pore forming agent from the sheet obtained; and
(iv) stretching, at an appropriate stretch ratio, the sheet from which the pore forming agent has been removed.

2.2. Method for Producing Porous Layer

The porous layer can be formed with use of a coating solution in which the resin described in the section (Resin) is dissolved or dispersed in a solvent. Further, the porous layer containing the resin and the filler can be formed with use of a coating solution which is obtained by (i) dissolving or dispersing the resin in a solvent and (ii) dispersing the filler in the solvent.

Note that the solvent can be a solvent in which the resin is to be dissolved. Further, the solvent can be a dispersion medium in which the resin or the filler is to be dispersed. Examples of a method for forming the coating solution include a mechanical stirring method, an ultrasonic dispersion method, a high-pressure dispersion method, and a media dispersion method.

Examples of the method for forming the porous layer include: a method in which the coating solution is applied directly to a surface of a base material and then the solvent is removed; a method in which (i) the coating solution is applied to an appropriate support, (ii) the solvent is removed so that the porous layer is formed, (iii) the porous layer and the base material are bonded together by pressure, and then (iv) the support is peeled off; a method in which (i) the coating solution is applied to an appropriate support, (ii) the base material is bonded to a resultant coated surface by pressure, (iii) the support is peeled off, and then (iv) the solvent is removed; and a method in which dip coating is carried out by immersing the base material in the coating solution, and then the solvent is removed.

It is preferable that the solvent be a solvent which (i) does not adversely affect the base material, (ii) allows the resin to be dissolved uniformly and stably, and (iii) allows the filler to be dispersed uniformly and stably. The solvent can be one or more solvents selected from the group consisting of, for example, N-methyl-2-pyrrolidone, N,N-dimethylacetamide, N,N-dimethylformamide, acetone, and water.

The coating solution can contain, as a component other than the above-described resin and the filler, for example, a disperser, a plasticizer, a surfactant, and a pH adjustor, when appropriate.

Note that the base material can be, for example, a film of another kind, a positive electrode, or a negative electrode, other than the above-described polyolefin porous film. When the base material for forming the porous layer is a polyolefin porous film, the laminated separator in accordance with an embodiment of the present invention can be produced.

The coating solution can be applied to the base material by a conventionally known method. Specific examples of such a method include a gravure coater method, a dip coater method, a bar coater method, and a die coater method.

If the coating solution contains an aramid resin, the aramid resin can be deposited by applying humidity to the coated surface. The porous layer can be formed in this way.

The solvent can be removed, from the coating solution which has been applied to the base material, for example, by a method in which the solvent is removed, by air blow drying or heat drying, from a coating film which is a film of the coating solution.

Further, the porosity and the average pore diameter of the porous layer to be obtained can be adjusted by changing an amount of the solvent in the coating solution.

A suitable solid content concentration of the coating solution may vary depending on, for example, kinds of the filler, but generally, the solid content concentration is preferably higher than 3% by weight and not higher than 40% by weight.

When the base material is coated with the coating solution, a coating shear rate may vary depending on, for example, kinds of the filler. Generally, the coating shear rate is preferably not lower than 2 (1/s) and more preferably in the range of 4 (1/s) to 50 (1/s).

Method for Preparing Aramid Resin

Examples of a method for preparing the aramid resin include, but are not particularly limited to, condensation polymerization of a para-oriented aromatic diamine and a para-oriented aromatic dicarboxylic acid halide. In such a method, the aramid resin obtained is substantially composed of repeating units in which amide bonds occur at para or quasi-para positions on the aromatic ring. "Quasi-para positions" refer to positions at which bonds extend in mutually opposite directions and extend coaxially or in parallel, such as 4 and 4' positions of biphenylene, 1 and 5 positions of naphthalene, and 2 and 6 positions of naphthalene.

A solution of poly(paraphenylene terephthalamide) can be prepared by, for example, a method including the following specific steps (I) through (IV).

(I) N-methyl-2-pyrrolidone is introduced into a dried flask. Then, calcium chloride which has been dried at 200° C. for 2 hours is added. Then, the flask is heated to 100° C. to completely dissolve the calcium chloride.

(II) The solution obtained in the step (I) is returned to room temperature, and then paraphenylenediamine is added and completely dissolved.

(III) While a temperature of the solution obtained in the step (II) is maintained at 20±2° C., terephthalic acid dichloride is added, the terephthalic acid dichloride being divided into 10 separate identical portions and being added at approximately 5-minute intervals.

(IV) While a temperature of the solution obtained in the step (III) is maintained at 20±2° C., the solution is aged for 1 hour, and is then stirred under reduced pressure for 30 minutes to eliminate air bubbles, so that the solution of the poly(paraphenylene terephthalamide) is obtained.

2.3. Method for Producing Graphite Negative Electrode

Examples of a method for producing the graphite negative electrode include: a method in which graphite is pressure-molded on the negative electrode current collector; and a method in which (i) the graphite is formed into a paste by use of an appropriate organic solvent, (ii) the negative electrode current collector is coated with the paste, and (iii) the paste is dried and then pressure is applied so that the paste is firmly fixed to the negative electrode current collector. The paste preferably contains the electrically conductive agent and the binding agent as described above.

2.4. Method for Controlling Average Void Volume of Separator Surface

Examples of a factor which control the average void volume of a porous layer surface include a dispersion state of the coating solution. When the base material is coated with a coating solution in a sufficient dispersion state, a separator which satisfies the requirement of an average void volume is likely to be obtained.

For example, stirring is generally included in preparation of the coating solution. When a time from completion of the stirring to coating with the coating solution is short, it is possible to coat the base material with the coating solution in a sufficient dispersion state. In an embodiment, the time from completion of last stirring in preparation of the coating solution to coating of the base material with the coating solution is preferably less than 1 hour, more preferably not more than 30 minutes, and even more preferably not more than 10 minutes.

Further, the coating solution which has been subjected to a microbubble treatment may keep the sufficient dispersion state for a longer time. When the coating solution has been subjected to the microbubble treatment, the time from completion of last stirring in preparation of the coating solution to coating of the base material with the coating solution is preferably not more than 20 days, more preferably not more than 48 hours, and even more preferably not more than 24 hours. The coating solution is subjected to the microbubble treatment for preferably not less than 30 minutes, and more preferably not less than 60 minutes. An upper limit of a time for which the coating solution is subjected to the microbubble treatment is not particularly limited, and for example, 72 hours.

Another example of the factor which controls the average void volume of the porous layer surface is the particle diameter of the filler or the proportion of the filler contained. If the particle diameter of the filler is too large or the proportion of the filler contained is too large, the surface of the porous layer tends to be uneven due to the filler. This is because filler particles have many asperities and are not planar. On the other hand, if the resin is contained in the porous layer at a higher proportion, the porous layer surface tends to have a smaller average void volume since the resin has higher flexibility than the filler. The average particle diameter (D50) and the proportion of the filler contained are preferably those described above.

Examples of a factor which controls an average void volume of a polyolefin porous film surface include coating speed and flatness of a coating bar. Specifically, if the coating speed is slower, a separator which satisfies the requirement of an average void volume is likely to be obtained.

2.5. Method for Controlling Non-Reactivity Parameter of Graphite Negative Electrode The non-reactivity parameter of the graphite negative electrode is controlled through the amount of the edge planes contained in graphite. If the amount of the edge planes is smaller, it is possible to increase the non-reactivity parameter. Examples of a factor which controls the amount of the edge planes include the particle diameter, shape, particle size distribution, and coating method of graphite particles.

The graphite particles have an average particle diameter (D50) of preferably not more than 50 µm, more preferably not more than 30 µm, and still more preferably not more than 20 µm (a lower limit of the average particle diameter is, for example, 10 nm). The graphite particles are preferably agglomerated, spherical, or granular. Further, the graphite particles are preferably covered with another substance. In relation to the particle size distribution of the graphite particles, the difference between D90 and D10 is preferably not more than 20 µm, more preferably not more than 15 µm, and still more preferably not more than 10 µm. The current collector is coated with a mixture containing graphite at a shear rate of preferably 1 (1/s) to 500 (1/s) and more preferably 5 (1/s) to 450 (1/s).

2.6. Method for Controlling Compressive Elastic Modulus in Thickness Direction

The compressive elastic modulus in the thickness direction of the separator can be adjusted, for example, by using an appropriate combination of materials of the porous layer and the polyolefin porous film.

3. Nonaqueous Electrolyte Secondary Battery Member and Nonaqueous Electrolyte Secondary Battery In a nonaqueous electrolyte secondary battery member in accordance with an aspect of the present invention, a positive electrode, the above-described separator, and a negative electrode are arranged in this order. A nonaqueous electrolyte secondary battery in accordance with an aspect of the present invention includes the above-described separator. In the nonaqueous electrolyte secondary battery member and the nonaqueous electrolyte secondary battery, the separator is provided such that a surface of the separator satisfies the requirement of the above-described average void volume, the surface facing the negative electrode.

The nonaqueous electrolyte secondary battery is not particularly limited in shape and can have any shape such as the shape of a thin plate (sheet), a disk, a cylinder, or a prism such as a cuboid. The nonaqueous electrolyte secondary battery is, for example, a nonaqueous electrolyte secondary battery that achieves an electromotive force through doping with and dedoping of lithium. The nonaqueous electrolyte secondary battery includes the nonaqueous electrolyte secondary battery member which is made of a positive electrode, the above-described separator, and a negative electrode formed in this order. Note that components of the nonaqueous electrolyte secondary battery other than the above-described separator are not limited to those described below.

The nonaqueous electrolyte secondary battery is generally structured such that a battery element is enclosed in an exterior member, the battery element including (i) a structure in which the negative electrode and the positive electrode face each other via the above-described separator and (ii) an electrolyte with which the structure is impregnated. Note that the doping means occlusion, support, adsorption, or insertion, and means a phenomenon in which lithium ions enter an active material of an electrode (e.g., a positive electrode).

Since the nonaqueous electrolyte secondary battery member includes the above-described separator, the nonaqueous electrolyte secondary battery member, when incorporated in the nonaqueous electrolyte secondary battery, can prevent a micro short circuit in the nonaqueous electrolyte secondary battery from occurring and consequently can improve safety of the nonaqueous electrolyte secondary battery. Further, since the nonaqueous electrolyte secondary battery includes the above-described separator, the nonaqueous electrolyte secondary battery can prevent a micro short circuit from occurring and is excellent in safety.

The nonaqueous electrolyte secondary battery can be produced by a conventionally known method. As one example, first, the nonaqueous electrolyte secondary battery member is formed by providing a positive electrode, the separator, and a negative electrode in this order. Next, the nonaqueous electrolyte secondary battery member is inserted into a container which serves as a housing for the nonaqueous electrolyte secondary battery. Further, the container is filled with a nonaqueous electrolyte, and then hermetically sealed while pressure is reduced in the container. In this way, the nonaqueous electrolyte secondary battery can be produced.

3.1. Positive Electrode

The positive electrode employed in an embodiment of the present invention is not limited to any particular one, provided that the positive electrode is one that is generally used as a positive electrode of a nonaqueous electrolyte secondary battery. Examples of the positive electrode include a positive electrode sheet having a structure in which an active material layer, containing a positive electrode active material and a binding agent, is formed on a positive electrode current collector. Note that the active material layer may further contain an electrically conductive agent and/or a binding agent.

Examples of the positive electrode active material include materials each capable of being doped with and dedoped of lithium ions. Specific examples of the materials include lithium complex oxides each containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. It is possible to use only one of the above electrically conductive agents or use two or more of the above electrically conductive agents in combination.

Examples of the binding agent include: fluorine-based resins such as polyvinylidene fluoride (PVDF); acrylic resin; and styrene butadiene rubber. Note that the binding agent serves also as a thickener.

Examples of the positive electrode current collector include electric conductors such as Al, Ni, and stainless steel. Among these electric conductors, Al is more preferable because Al is easily processed into a thin film and is inexpensive.

Examples of a method for producing the positive electrode sheet includes: a method in which the positive electrode active material, the electrically conductive agent, and the binding agent are pressure-molded on the positive electrode current collector; and a method in which (i) the positive electrode active material, the electrically conductive agent, and the binding agent are formed into a paste with use of an appropriate organic solvent, (ii) the positive electrode current collector is coated with the paste, and (iii) the paste is dried and then pressured so that the paste is firmly fixed to the positive electrode current collector.

3.2. Nonaqueous Electrolyte

A nonaqueous electrolyte for an embodiment of the present invention is not limited to any particular one, provided that the nonaqueous electrolyte is one that is generally used for a nonaqueous electrolyte secondary battery such as a lithium ion secondary battery. The nonaqueous electrolyte can be, for example, a nonaqueous electrolyte containing an organic solvent and a lithium salt dissolved therein. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. It is possible to use only one of the above lithium salts, or use two or more of the above lithium salts in combination.

Examples of the organic solvent to be contained in the nonaqueous electrolyte include carbonates, ethers, esters, nitriles, amides, carbamates, sulfur-containing compounds, and fluorine-containing organic solvents each obtained by introducing a fluorine group into any of these organic solvents. It is possible to use only one of the above organic solvents, or use two or more of the above organic solvents in combination.

EXAMPLES

The following description will discuss embodiments of the present invention in greater detail with reference to Examples and Comparative Examples. Note, however, that the present invention is not limited to the following Examples.

Measurements of Physical Properties

In Examples and Comparative Examples, physical properties, etc. of nonaqueous electrolyte secondary battery separators and polyolefin porous films were measured by the following method.

(1) Average Void Volume of Separator Surface

The following steps were used to calculate an average void volume of a separator surface.

1. A laminated separator was fixed to a glass plate such that the porous layer is on an upper side.

2. A scanning electron microscopic image of a porous layer surface was captured (magnification ratio: 5000 times) by using a scanning electron microscope (S-3000H, manufactured by Hitachi High-Technologies Corporation).

3. A resultant image was loaded by using image analysis software Image J (provided by the National Institute of Health), and a scale was registered.

4. A rectangular area was selected by use of a polygon tool such that the whole of a separator surface could be contained. In selecting the rectangular area, care was taken so that an area irrelevant to the separator surface (e.g., file name of the image, black background) would not be contained in the rectangular area.

5. "Edit-clear outside" was selected from a pulldown menu, and a portion which was outside the area selected was trimmed.

6. "8-bit" was selected from "Image-Type" of the pulldown menu.

7. "Process-Filters-Median" was selected from the pulldown menu, the setting was confirmed to be "2 pixel", and an OK-button was clicked. This removed smaller noises.

8. "Image-Adjust-threshold" was selected, and positions of two slide bars were appropriately adjusted. This caused void portions on the separator surface to be displayed in red. After the adjustment was completed, "apply" was selected.

9. "Analyze-analyze particle" was selected. This caused the respective areas of the void portions on the separator surface to be automatically calculated, and the calculated numerical values were saved in a csv file. The saved file was opened, and among the void portions on the separator surface that have been subjected to the calculation, a void portion having an area of not less than 0.02 $\mu m^2$ was selected. The division of a sum of the areas of void portions having an area of not less than 0.02 $\mu m^2$ by the number of void portions having an area of not less than 0.02 $\mu m^2$ was calculated, and a value obtained by raising the calculation result to the power of three-halves was set as the average void volume of the separator surface that has voids susceptible to penetration of a dendrite.

(2) Non-Reactivity Parameter of Graphite Negative Electrode

A CR2032-type coin cell configured as below was assembled in an argon glove box. As an electrolyte, a solution (1M) of $LiClO_4$ in ethylene carbonate/diethyl carbonate (1/1=vol/vol, manufactured by Tomiyama Pure Chemical Industries, Ltd.) was used. In this coin cell, a laminate of a laminated separator and a graphite electrode mix which serves as a working electrode corresponds to the laminate in accordance with an embodiment of the present invention.

Working electrode: The graphite electrode mix produced in Examples and Comparative Examples and Cu foil
Separator (a porous layer is formed so as to face the graphite electrode mix)
Counter electrode: Li (thickness: 200 μm, manufactured by Honjo Metal Co., Ltd.)

The coin cell assembled was subjected to the following steps.

1. The coin cell was left to stand still for 4 hours so as to be impregnated with the electrolyte.

2. At room temperature, one charge and discharge cycle was carried out at a current density of 0.2 $mA/cm^2$ and in a voltage range of 3 V to 0.005 V. A charge-discharge efficiency was determined by dividing a discharge capacity by a charge capacity (Charge-discharge efficiency=discharge capacity/charge capacity).

3. Correspondingly, a charge-discharge efficiency was measured for a coin cell including a working electrode that does not include a graphite electrode mix and includes Cu foil alone. A non-reactivity parameter was determined by dividing the charge-discharge efficiency measured for the coin cell with a graphite electrode mix by the charge-discharge efficiency measured for the coin cell without a graphite electrode mix (Non-reactivity parameter of graphite negative electrode=charge-discharge efficiency measured for coin cell with graphite electrode mix/charge-discharge efficiency measured for coin cell without graphite electrode mix).

Graphite has an edge plane and a basal plane. According to estimates by the inventors of the present application, electrolyte decomposition and lithium metal deposition occur on the edge plane. In contrast, for Cu foil, which is a homogeneous structure, electrolyte decomposition and lithium metal deposition occur on the entire surface. Accordingly, the non-reactivity parameter of a graphite negative electrode can be regarded as a normalized parameter of the decomposition reactivity of an electrolyte with a graphite negative electrode. According to the above definition, when a charge-discharge efficiency is higher, the decomposition reactivity of an electrolyte is lower. Accordingly, when the non-reactivity parameter of a graphite negative electrode is higher, the decomposition reactivity of an electrolyte is lower. The non-reactivity parameter of a graphite negative electrode is in correlation with the number of the edge planes of the graphite. When the non-reactivity parameter is higher, the number of the edge planes is smaller.

(3) Compressive Elastic Modulus

A displacement ratio was obtained from compression properties of the laminated separator, the compression properties having been measured by using a micro compression tester (MCT-510, manufactured by Shimadzu Corporation). A measurement mode was set to a loading and unloading test mode at a set indentation depth. Specifically, a separator was measured in advance for a film thickness. Then, the separator was cut into a square with a 1-cm side, and bonded onto a measurement stage. Then, a compression test was carried out by using a plane indenter (50 μm in diameter) at a loading rate of 0.45 mN/sec until a load was increased to 20 mN. A slope [N/μm] was obtained by linear approximation in a range of 5 mN to 15 mN of a displacement-load curve thus obtained. The following formula was used to calculate the compressive elastic modulus.

$$\text{Compressive elastic modulus}[P] = \text{slope}[N/\mu m] \times \text{film thickness}[\mu m]/\text{indenter area}[m^2]$$

(4) Shape of Dendrite

A CR2032-type coin cell was used which had the same configuration as the coin cell that was used in the non-reactivity parameter measurement for the graphite negative electrode.

The coin cell assembled was subjected to the following steps.

1. The coin cell was left to stand still for 4 hours so as to be impregnated with the electrolyte.

2. At room temperature, one charge and discharge cycle was carried out at a current density of 0.2 $mA/cm^2$ and in a voltage range of 3 V to 0.005 V.

3. At a current density of 0.2 $mA/cm^2$, the coin cell was fully charged to 0.005 V.

4. At a current density of 6 $mA/cm^2$, the coin cell was overcharged for 333 seconds. This caused deposition of Li on the graphite electrode mix.

5. In an argon glove box, the electrolyte having adhered onto the graphite electrode mix was cleaned with diethyl carbonate.
6. While argon was kept hermetically sealed, a sample taken out was observed under a scanning electron microscope (SEM).

An aspect ratio of a dendrite was determined by calculating a ratio between the long diameter and the short diameter of the dendrite by use of a 5000-fold magnification SEM image (Aspect ratio of dendrite=long diameter/short diameter). The respective aspect ratios of ten dendrites were calculated, and the largest of the calculated aspect ratios was determined to be a maximum aspect ratio.

A dendrite whose shape was granular and/or tabular did not grow in a thickness direction of a separator, and therefore, the separator containing such a dendrite was determined to have a great short circuit prevention effect. On the other hand, a dendrite whose shape was fibrous grew in the thickness direction of a separator. This dendrite is likely to penetrate through the separator. Therefore, the separator containing such a dendrite was determined to have a small short circuit prevention effect.

(5) Intrinsic Viscosity

A flow time was measured by an Ubbelohde capillary viscometer. Solutions measured were (i) a solution in which 0.5 g of an aramid resin was dissolved in 100 mL of a concentrated sulfuric acid (96% to 98%) and (ii) the concentrated sulfuric acid (96% to 98%) in which no resin was dissolved. In the measurement, the temperature was set to 30° C. The following formula was used to obtain an intrinsic viscosity from the flow time obtained.

$$\text{Intrinsic viscosity} = \ln(T/T_0)/C \text{(unit:dL/g)}$$

T: Flow time of solution of aramid resin in concentrated sulfuric acid
$T_0$: Flow time of concentrated sulfuric acid
C: Concentration (g/dL) of aramid resin in solution of aramid resin in concentrated sulfuric acid Synthesis Example 1

According to the following steps, poly(paraphenylene terephthalamide) was synthesized.
1. A separable flask (capacity: 3 L) having a stirring blade, a thermometer, a nitrogen inlet pipe, and a powder addition port was prepared.
2. The separable flask was sufficiently dried, and 2200 g of N-methyl-2-pyrrolidone (NMP) was put in the separable flask.
3. Then, 151.07 g of calcium chloride powder (having been subjected to vacuum drying at 200° C. for 2 hours) was added and the temperature was increased to 100° C., so that the calcium chloride powder was completely dissolved.
4. The temperature of a calcium chloride NMP solution thus obtained was decreased back to room temperature.
5. Further, 68.23 g of paraphenylenediamine was added and completely dissolved.
6. While the temperature of a solution thus obtained was maintained at 20° C.±2° C., 124.61 g of terephthalic acid dichloride which was divided into 10 separate identical portions was added to the solution at approximately 5-minute intervals.
7. While the temperature of a solution thus obtained was maintained at 20° C.±2° C., the solution was aged for 1 hour while being stirred.
8. The solution thus aged was filtered through a 1500-mesh stainless steel gauze. In this way, an aramid polymerization liquid 1 was obtained.

The poly(paraphenylene terephthalamide) contained in the aramid polymerization liquid 1 had an intrinsic viscosity of 1.7 g/dL.

Synthesis Example 2

An aramid polymerization liquid 2 was obtained as in Synthesis Example 1, except that the amount of terephthalic acid dichloride added was changed to 124.48 g. The poly(paraphenylene terephthalamide) contained in the aramid polymerization liquid 2 had an intrinsic viscosity of 1.6 g/dL.

Example 1

Graphite Electrode Mix

According to the following steps, a graphite electrode mix was prepared.
1. Graphite A (Meso Carbon Micro Beads (MCMB), average particle diameter: 20 μm) and PVDF (KF polymer 9305, manufactured by Kureha Corporation) were mixed together in a weight ratio of 9:1 and the mixture was kneaded so that a coating solution was obtained. A planetary centrifugal mixer ("AWATORI RENTARO", the product name of the mixer) was used for the kneading. One-minute kneading at 2000 rpm was repeated five times.
2. Cu foil was coated with a coating solution thus obtained by use of a bar coater so that a coated material was obtained. The moving speed of the bar coater was set to a speed as low as 10 cm/min.
3. The coated material obtained was dried without wind and at 80° C. in a dryer. This increased the uniformity among particles of a graphite electrode mix. A graphite electrode mix 1 thus obtained had a thickness of 60 μm, and included a mixture layer having a weight per unit area of 5 mg/cm².

Separator

First, 100 g of the aramid polymerization liquid 1 was weighed in a flask. Then, 6.0 g of Alumina C (manufactured by Nippon Aerosil Co., Ltd., average particle diameter: 0.013 μm) and 6.0 g of AKP-3000 (manufactured by Sumitomo Chemical Co., Ltd., average particle diameter: 0.7 μm) were added. At this point, the weight ratio of the poly(paraphenylene terephthalamide) to the entire amount of alumina was 33:67. Next, NMP was added so that a solid content became 6.0% by weight, and stirring was carried out for 240 minutes. The "solid content" here refers to the total weight of the poly(paraphenylene terephthalamide) and the alumina. Further, 0.73 g of calcium carbonate was added and stirring was carried out for 240 minutes, so that a resultant solution was neutralized and a slurry coating solution 1 was prepared.

The coating solution 1 was left to stand still for 8 minutes. Thereafter, the coating solution 1 was applied, by a doctor blade method, onto a polyolefin porous film (thickness: 12 μm) made of polyethylene. A resultant coated material 1 was left to stand still in air at 50° C. and at a relative humidity of 70% for 1 minute, so that poly(paraphenylene terephthalamide) was deposited. Next, the coated material 1 was immersed in ion-exchange water, so that calcium chloride and a solvent were removed. Subsequently, the coated material 1 was dried in an oven at 70° C., and a laminated separator 1 was obtained.

Various physical properties were measured by using the graphite electrode mix 1 and the laminated separator 1 obtained. The results are listed in Table 1.

Example 2

Graphite Electrode Mix

A graphite electrode mix 2 was obtained as in Example 1, except that graphite B (carbon-clad natural graphite, average particle diameter: 20 μm) was used instead of the graphite A.

Separator

The laminated separator 1 prepared in Example 1 was used.

Various physical properties were measured by using the graphite electrode mix 2 obtained and the laminated separator 1. The results are listed in Table 1.

Example 3

Graphite Electrode Mix

The graphite electrode mix 2 prepared in Example 2 was used.

Separator

A slurry coating solution 2 was obtained as in Example 1, except that the solution neutralized was subjected to a microbubble treatment for 30 minutes. The microbubble treatment was carried out by supplying nitrogen through a pipe in the vicinity of a stirrer, while the coating solution was stirred with use of a stirring bar and the stirrer by using a Three-One motor (manufactured by SHINTO Scientific Co., Ltd.). A laminated separator 2 was obtained as in Example 1, except that the coating solution 2 having been left to stand still for 3 minutes was used.

Various physical properties were measured by using the graphite electrode mix 2 and the laminated separator 2 that were obtained. The results are listed in Table 1.

Example 4

Graphite Electrode Mix

The graphite electrode mix 2 prepared in Example 2 was used.

Separator

First, 100 g of the aramid polymerization liquid 2 was weighed in a flask. Then, 6.0 g of Alumina C (manufactured by Nippon Aerosil Co., Ltd., average particle diameter: 0.013 μm) was added. At this point, the weight ratio of the poly(paraphenylene terephthalamide) to the entire amount of alumina was 1:1. Next, NMP was added so that a solid content became 4.5% by weight, and stirring was carried out for 240 minutes. The "solid content" here refers to the total weight of the poly(paraphenylene terephthalamide) and the alumina. Further, 0.73 g of calcium carbonate was added and stirring was carried out for 240 minutes, so that a resultant solution was neutralized and a slurry coating solution 3 was prepared. A laminated separator 3 was obtained as in Example 1, except that the coating solution 3 having been left to stand still for 8 minutes was used.

Various physical properties were measured by using the graphite electrode mix 2 and the laminated separator 3 obtained. The results are listed in Table 1.

Example 5

Graphite Electrode Mix

The graphite electrode mix 2 prepared in Example 2 was used.

Separator

A slurry coating solution 4 was obtained as in Example 3, except that the solution neutralized was subjected to a microbubble treatment for 30 minutes. The microbubble treatment was carried out by supplying nitrogen through a pipe in the vicinity of a stirrer, while the coating solution was stirred with use of a stirring bar and the stirrer by using a Three-One motor (manufactured by SHINTO Scientific Co., Ltd.). A laminated separator 4 was obtained as in Example 4, except that the coating solution 4 having been left to stand still for 3 minutes was used.

Comparative Example 1

Graphite Electrode Mix

A comparative graphite electrode mix 1 was obtained as in Example 1, except that graphite C (natural graphite, average particle diameter: 15 μm) was used instead of graphite A.

Separator

The laminated separator 1 prepared in Example 1 was used.

Various physical properties were measured by using the comparative graphite electrode mix 1 obtained and the laminated separator 1. The results are listed in Table 1.

Comparative Example 2

Graphite Electrode Mix

The graphite electrode mix 2 prepared in Example 2 was used.

Separator

A comparative coating solution 1 was prepared by mixing 9 g of a polyvinylidene fluoride resin, 0.8 g of alumina having an average particle diameter of 500 nm, and 0.2 g of alumina having an average particle diameter of 50 nm. The comparative coating solution 1 having been left to stand still for 8 minutes was applied to one surface of a polyethylene film (thickness: 12 μm), so that a comparative laminated separator 1 was obtained.

Various physical properties were measured by using the graphite electrode mix 2 and the comparative laminated separator 1 obtained. The results are listed in Table 1.

Comparative Example 3

Graphite Electrode Mix

The comparative graphite electrode mix 1 prepared in Comparative Example 1 was used.

Separator

The comparative laminated separator 1 the same as that in Comparative Example 2 was used.

Various physical properties were measured by using the comparative graphite electrode mix 1 and the comparative laminated separator 1 obtained. The results are listed in Table 1.

Comparative Example 4

Graphite Electrode Mix

The graphite electrode mix 2 prepared in Example 2 was used.

Separator

A comparative laminated separator 2 was obtained as in Example 1, except that coating was carried out after the coating solution 1 was left to stand still for 1 hour and 50 minutes.

Various physical properties were measured by using the graphite electrode mix 2 and the comparative laminated separator 2 obtained. The results are listed in Table 1.

TABLE 1

| | Separator | Graphite electrode mix | AVV of separator ($\mu m^3$) | CEM of separator (MPa) | Non-reactivity parameter of graphite negative electrode (%) | Maximum aspect ratio of dendrite | Shape of dendrite | Short circuit prevention effect |
|---|---|---|---|---|---|---|---|---|
| Ex 1 | Laminated separator 1 | Graphite electrode mix 1 | 0.0078 | 92 | 238 | 1.1 | Granular | Great |
| Ex 2 | Laminated separator 1 | Graphite electrode mix 2 | 0.0078 | 92 | 233 | 13 | Granular | Great |
| Ex 3 | Laminated separator 2 | Graphite electrode mix 2 | 0.0089 | 78 | 233 | 1.3 | Tabular | Great |
| Ex 4 | Laminated separator 3 | Graphite electrode mix 2 | 0.0078 | 108 | 233 | 7 | Tabular | Great |
| Ex 5 | Laminated separator 4 | Graphite electrode mix 2 | 0.0079 | 89 | 233 | 3.6 | Granular + Tabular | Great |
| Com Ex 1 | Laminated separator 1 | Comparative graphite electrode mix 1 | 0.0078 | 92 | 225 | 15 | Fibrous | Small |
| Com. Ex 2 | Comparative laminated separator 1 | Graphite electrode mix 2 | 0.027 | 72 | 233 | 25 | Fibrous | Small |
| Com. Ex 3 | Comparative laminated separator 1 | Comparative graphite electrode mix 1 | 0.027 | 72 | 225 | 21 | Fibrous | Small |
| Com. Ex 4 | Comparative laminated separator 2 | Graphite electrode mix 2 | 0.049 | 129 | 233 | 16 | Fibrous | Small |

Abbreviations:
Ex: Example;
Com. Ex: Comparative Example;
AVV: Average Void Volume;
CEM: Compressive Elastic Modulus Results In Examples 1 to 5, the graphite negative electrode having a non-reactivity parameter of 230% and the separator having an average void volume of a surface thereof of not more than 0.015 $\mu m^3$ were used in combination for a nonaqueous electrolyte secondary battery. As a result, dendrites that were generated by overcharging grew to be granular or tabular, and the maximum aspect ratio was as small as not more than 13. This indicates that the laminates in accordance with Examples 1 to 5 are separators having a great short circuit prevention effect. This is considered to be because porous layers were formed under the condition where fine bubbles were left in the coating solutions by carrying out coating immediately after the coating solutions were prepared or subjecting the coating solutions to microbubble treatment.

The laminates in accordance with Comparative Examples 1 and 3 had a non-reactivity parameters of a graphite negative electrode of more than 230%. In other words, graphite negative electrodes having a large non-reactivity parameter were used. The laminates in accordance with Comparative Examples 2 and 4 had an average void volume of a separator surface of more than 0.015 $\mu m^3$. In other words, separators having outermost surfaces that were not smooth and that had many voids were used. As a result, dendrites that were generated by overcharging grew to be fibrous. This indicates that the laminates in accordance with Comparative Examples 1 to 4 are separators having a small short circuit prevention effect.

The separators in accordance with Examples 1 to 5 each had a compressive elastic modulus in the thickness direction of not less than 65 MPa. In other words, the separators in accordance with Examples 1 to 5 are rigid, in the thickness direction, enough that voids are unlikely to be generated at the interface between the negative electrode and the separator. This also indicates that the laminates in accordance with Examples 1 to 5 have a great short circuit prevention effect.

Reference Experiment

Capacitances of the graphite electrode mixes prepared in Examples were measured. The following are specific steps of the measurement. The measurement results are listed in Table 2.
1. Two sheets of graphite electrode mixes that were identical to each other were prepared. The preparation method for the graphite electrode mixes were the same as that described in Examples described above.
2. A separator made of a polyolefin was sandwiched between the graphite electrode mixes so that an electric double layer capacitor was prepared. As a cell, a CR2032-type coin cell was used. As an electrolyte, a solution (1M) of $LiClO_4$ in ethylene carbonate/diethyl carbonate (1/1=vol/vol, manufactured by Tomiyama Pure Chemical Industries, Ltd.) was used.
3. The capacitor was left to stand still for 12 hours so as to be sufficiently impregnated with the electrolyte.
4. A capacitance was measured under conditions of a current density of 30 $\mu A$ and a voltage range of 0 V to 0.4 V (potentials at which the electrolyte does not decompose) Specifically, the capacitance was calculated on the basis of the following formula.

$$C=It/w\Delta V$$

C: capacitance ($Fg^{-1}$)
I: electric current (A)

t: charging time (s)
w: weight of graphite (g)
ΔV: voltage range (V)

TABLE 2

|  | Non-reactivity parameter (%) | Capacitance ($Fg^{-1}$) |
| --- | --- | --- |
| Graphite electrode mix 1 | 238 | 0.04 |
| Graphite electrode mix 2 | 233 | 0.16 |
| Comparative graphite electrode mix 1 | 225 | 0.41 |

Results

As is clear from Table 2, the non-reactivity parameter of the graphite negative electrode is in correlation with the capacitance. This is considered to be because both the non-reactivity parameter and the capacitance are in correlation with the number of the edge planes of graphite. Accordingly, the capacitance of the graphite negative electrode is regarded as another parameter that represents the number of the edge planes included in the graphite negative electrode.

INDUSTRIAL APPLICABILITY

A nonaqueous electrolyte secondary battery laminate in accordance with an embodiment of the present invention can be used for production of a nonaqueous electrolyte secondary battery in which the occurrence of a micro short circuit during charging and discharging is restrained and which is excellent in safety.

The invention claimed is:

1. A nonaqueous electrolyte secondary battery laminate comprising:
   a separator and a graphite negative electrode,
      the graphite negative electrode having a non-reactivity parameter of not less than 230%,
      the separator having a surface that faces the graphite negative electrode and has an average void volume of not more than 0.015 µm³, wherein the average void volume is calculated by analyzing a scanning electron microscope image (SEM image) of the separator surface, and
      wherein the separator is a laminated separator including a porous layer and a polyolefin porous film, and
      wherein the porous layer faces the graphite negative electrode, and wherein the porous layer has pores having diameters of not more than 0.5 µm.

2. The laminate according to claim 1, wherein the porous layer contains a nitrogen-containing aromatic resin.

3. The laminate according to claim 2, wherein the nitrogen-containing aromatic resin is an aramid resin.

4. The laminate according to claim 1, wherein the separator has a compressive elastic modulus, in a thickness direction of the separator, of not less than 50 MPa.

5. A nonaqueous electrolyte secondary battery member comprising: a positive electrode; and a laminate according to claim 1,
   wherein the positive electrode, the separator, and the graphite negative electrode are arranged in this order.

6. A nonaqueous electrolyte secondary battery comprising a laminate according to claim 1.

7. A nonaqueous electrolyte secondary battery comprising a member according to claim 6.

* * * * *